Patented June 28, 1949

2,474,782

UNITED STATES PATENT OFFICE 2,474,782

CATALYTIC DEHYDROGENATION OF PIPERAZINE

James Kenneth Dixon, Riverside, Conn., assignor to American Cyanamid Company, New York, N. Y., a corporation of Maine No Drawing. Application April 12, 1946, Serial No. 661,876

15 Claims. (Cl. 260—250)

This invention relates to catalytic dehydrogenation in the vapor phase of piperazine and/or hydrates of piperazines. More particularly, it relates to the use, as catalysts therefor, of a metal such as palladium. As such, the present invention constitutes a continuation-in-part of my copending original application Serial No. 443,703, filed May 20, 1942, now Patent No. 2,400,398.

Pyrazine, as an intermediate for the manufacture of aminopyrazines, and ultimately sulfanilamidopyrazines, has become of increasing commercial importance, particularly in the field of chemotherapy. Unfortunately, while pyrazine itself is comparatively well known, processes for its production which are suitable for development on a commercial scale have not been available. In the past, production has always been on a comparatively small scale, by inefficient processes giving yields of about 3–6%.

By way of contrast, piperazine, differing from pyrazine only by the degree of hydrogenation, may be obtained by a number of different procedures and is commercially available either in relatively pure form or as a hydrate such as the hexahydrate. Accordingly, on the basis of availability alone, piperazine would appear to be a suitable raw material to serve as a commercial source of pyrazine. It would appear theoretically possible to convert piperazine, $C_4H_{10}N_2$, to pyrazine, $C_4H_4N_2$, simply by removing the extra hydrogens.

The simplicity of this reaction, however, is more apparent than real. Actually the dehydrogenation is very difficult to carry out. Prior to this invention, no method was known of carrying out this reaction in an economically feasible manner. The reaction is difficult to initiate, a high temperature being necessary. Therefore, the problem is complicated in that dehydrogenation from piperazine to pyrazine will not be the only reaction to occur. Under the temperature conditions required, the ring structure will be expected to be cracked with concurrent formation of side reaction products and ammonia. Therefore, the reaction is not only difficult to initiate but when started is difficult to direct.

Under these conditions, a catalyzed reaction offers the most likelihood of success, but whether cracking or dehydrogenation will be catalyzed is wholly unpredictable. In fact, because of the structure of the pyrazine ring, containing two symmetrically-positioned heterocyclic nitrogen atoms, the cracking reaction is the most reasonable to anticipate.

A catalyst suitable for the purpose therefore must be one meeting definite requirements. As a first consideration the catalyst must be capable of initiating and carrying out dehydrogenation. Secondly, the catalyst must have the minimum possible tendency to promote cracking, both of the piperazine and of the dehydrogenation products.

A desirable catalyst also must meet certain economical requirements if it is to be used in a feasible commercial process. The catalyst should be one which is readily available, has a reasonable life, is not poisoned by any materials necessarily present in the reaction vessel and is operable at a feasible temperature. The catalyst should preferably be capable of being readily reactivated. This latter is particularly important in a commercial operation. Finally, the desired catalyst should be one adapted to use in a continuous process.

These requirements make the search for a suitable catalyst much more exacting. Nevertheless, if such a catalyst can be found, the process of continuously converting piperazine to pyrazine remains a prospectively desirable commercial operation.

It is, therefore, the object of the present invention to find a suitable continuous process for the dehydrogenation of piperazine to pyrazine on a commercially-feasible basis. It is also an equally important object of the invention to find a catalyst, or group of catalysts, suitable for use in that process.

In general, the desired objects of the present invention are accomplished by continuous catalytic dehydrogenation of the piperazine to pyrazine in the vapor phase. In so doing, use is made of a palladium metal catalyst, in the use of which the side reaction products obtained are particularly low.

In general, the process steps of the present invention may be simply carried out. Piperazine is vaporized and the resultant vapors, preferably after preheating, are passed over the selected dehydrogenation catalyst. The rate of vapor flow and correspondingly the contact time with the catalyst may be regulated by the rate at which piperazine is fed to the vaporizer and/or by blending an inert vapor therewith. Introduction of the inert vapors may be before or during the preheating. After being passed over the catalyst, the reacted vapors are condensed and the pyrazine collected therefrom, usually by fractionation. If so desired unreacted piperazine can be readily recovered and recycled.

As compared with the prior art processes, yielding 3–6% of pyrazine, in the present process yields of up to about 25% or more of pyrazine can be obtained in a single pass through the catalytic zone. By recycling the unreacted piperazine this can be raised to 60% or better with substantially 100% piperazine conversion.

While it is an advantage of the present invention that it is not limited to any particular apparatus or organization of apparatus, certain elements are found to be extremely useful in carrying out the process. For example, the piperazine should pass through the catalytic zone at a predetermined rate. Therefore some feed control means should be provided to perform this regulation. It is also more or less necessary to control the amount of diluent gas or vapor and thereby control the time of contact with the catalyst. These controls may be fairly simple. For example, a rate of flow indicator and a hand valve may be used. If so desired, a more complicated system of automatic controls may be used.

While it is not absolutely essential to do so, for the best results the material should be fully vaporized before reaching the catalyst in order that a substantially uniform catalysis be obtained. In order to accomplish this it was found that the provision of a vaporizing chamber prior to the catalytic chamber was a practical solution. The piperazine or its hydrate may be fed directly to the chamber in which it may be vaporized, usually by heating. The resulting vapors may then be picked up by a stream of inert gas and carried into contact with the catalyst. Or, if so desired, the inert carrier gas and the piperazine may be mixed prior to being fed to the vaporizer. This latter procedure is quite simple where the piperazine is fed to the apparatus in the form of a solution in a solvent the vapors of which are suitable as diluents.

From the vaporizer, the gas and vapor mixture is passed to a catalytic chamber in which the actual dehydrogenation takes place. The catalyst is usually contained in a tubular converter, which is preferably but not necessarily vertically positioned. Passage of the vapors may be either up or down, preferably the latter, when the converter is other than horizontal. A tubular chamber is preferable in that it promotes a more uniform distribution and flow through a packed converter. From the catalyst chamber reacted vapors are passed to a condensing system in which the vapors are condensed and the fixed gases allowed to escape. This condensing system may be of any suitable type.

It was found well to provide a fractionating system in connection with the condenser so that the pyrazine may be separated from any unreacted piperazine, water or other liquids which may be condensed. This fractionator may be a part of the condensing system itself or the total condensate may be collected and fractionated in a subsequent operation. The latter operation is preferable where water is present during the reaction since pyrazine and water appear to form a constant boiling mixture and it may be desirable to dry the total condensate before fractionation. Drying may be readily carried out by using an absorbent such as pelleted sodium hydroxide, anhydrous sodium sulphate, calcium chloride or the like.

Piperazine itself, a piperazine hydrate such as the hexahydrate or even in some cases volatile salts of piperazine may be used as a starting material in the present process. Each has certain advantages and disadvantages. For example, in order to insure steady flow it is helpful to feed the material to the apparatus as a liquid. Since the hydrate melts much more readily than piperazine itself, it has an advantage in this respect. Further, it is more readily vaporized than piperazine. On the other hand, when a hydrated form is used as the raw material more water is present in the condensate with the resultant difficulty in isolating the pyrazine product. Neither form appears to exhibit any particular advantage so far as the actual degree of dehydrogenation which can be finally achieved is concerned. Accordingly, in the present specification and the accompanying claims the term "piperazine" is used generically to include piperazine in a hydrated form.

As a general practice the dilution of vapors being subjected to catalytic action in order to regulate the time of contact between vapor and catalyst, or to depress undesirable side reactions, has become more or less well known. In the present case, any inert gas may be used. It was found that good results could be obtained using nitrogen.

It was also found feasible to regulate the feed of piperazine by diluting it. A satisfactory procedure was found to exist in making up a solution of piperazine in a volatile inert solvent and allowing the solvent vapors to replace all or a major portion of the diluent gas. Piperazine forms an approximately 4% solution in benzene at room temperature. Using such a substantially saturated solution was found to produce good results. Benzene did not interfere with the catalytic reaction and because of its slow molecular weight permits a good dilution by weight while maintaining a high mol ratio of diluent to piperazine. Other volatile solvents can be used if so desired, piperazine being soluble for example in such solvents as quinoline, toluene and xylene. Although a saturated benzene solution produces good results, if it is desired to increase the piperazine-solvent ratio it is quite simple to volatilize the solvent separately and blend the vapors before or during preheating. One precaution should be observed in that the benzene or other diluent used should be as nearly sulfur-free as possible.

While the catalytic material may be used per se and effective dehydrogenation obtained, this is not necessarily the best practice. The 100% catalysts are difficult to use effectively. Physically, they are not easy to prepare and handle. In use, it is difficult to obtain effective utilization of the potential catalytic capabilities of the whole catalyst mass. This makes for inefficient use. Similarly, the use of a 100% catalyst makes a reactivation operation more difficult to carry out efficiently. Further, unsupported catalysts ordinarily have poor resistance to high temperature and trouble is usually encountered through sintering during use and reactivation.

Because of these factors, it is preferable that the catalyst be supported on a suitable carrier. For this purpose a number of materials have been found suitable. These include such materials as alumina, "activated alumina," silica, "Celite" and charcoal. The particular carrier chosen should be one which is normally surface-active but which will not have any appreciable pyrolytic effect on the dehydrogenation reaction which is to be carried out. Alumina clays with appreciable alkali or alkaline earth metal contents therefore are not productive of good supports.

Use of the catalysts of the present invention is characterized by the fact that effective results are obtained at relatively low temperatures. While the effective temperature range is usually between about 250–350° C., this is somewhat lower than that consistently used in conjuction with dehydrogenation catalysts of the difficultly-reducible oxide types and with metals of the easily-reducible oxides. As a result, charcoal is a highly suitable carrier. It has the advantage that it may be readily burned out to permit recovery and redeposition of the expensive catalytic metals. On the other hand, because it is easily burned off a charcoal support is not wholly suited to reactivation since the temperatures required therefor are somewhat higher and tend to destroy the charcoal support. "Activated alumina" is readily available in several forms, is mechanically strong, easily handled and is highly successful in use. It does not interfere with the action of the catalytic metal and is free from trouble with sintering at reactivation temperatures. It is therefore perhaps the preferred supporting material.

The support may be in the simple physical form of broken granules screened to a suitable size. However, a preferred embodiment of the practice is to use preformed pellets of powdered material. The preformed pellets have a number of advantages. The size is chosen in accordance with the desired contact time. They are wholly uniform in size which permits of more ready and uniform packing of the converter column. The flow of vapors therethrough is therefore more uniform, the contact time is more easily estimated and held to the desired conditions.

Preparation of the catalysts for use in the present invention is relatively simple. An aqueous solution of a palladium salt, usually the chloride, is uniformly deposited on the carrier. While any salt may be used, the nitrate is usually readily available and being easily broken down is perhaps preferred. Preferably this deposition is carried out in two or three successive steps, approximately equal amounts being deposited in each step and the carrier being thoroughly dried between depositions. After deposition of the salt the composition is heated to break down the salt and then heated sufficiently to reduce the residue to the desired metal oxide. This usually may be done by heating up to less than about 400° C. but since the catalyst is frequently used at somewhat above this temperature it preferably should be calcined to a somewhat higher temperature. Finally, but not always necessarily, it is usually desirable that the calcined catalyst be given a treatment at about the expected reaction temperature range in an atmosphere of hydrogen.

Reaction temperatures used in the present process fall within the general range of about 250–450° C. The optimum results, however, are usually obtained at an intermediate value within this range. For the palladium metal catalysts of the present invention the most desirable range will be between 350–400° C. While this is considered the reaction temperature it is the temperature of the catalyst body. The actual temperature of the vapors passing thereover may not exactly coincide since such temperatures are not only difficult to measure but vary with the feed rate and hence for any given catalyst volume on the time of contact. While the preferred range is usually between 350–400° C., such accurate control of the temperature is extremely difficult to maintain over extended periods and the wider range of 300–425° C., or even 450° C., is a good average practice for these catalysts.

Contact time, one of the most important controls, is easily regulated by the amount of material vaporized. As was noted above, it is preferred to pass fully vaporized material over the catalyst. The rate of piperazine fed to the vaporizer therefore is a function of the contact time. Since piperazine is easily melted, it is easily fed per se as a fluid in amounts regulated by a displacement feeder, a simple flow meter or the like. On the other hand, as noted above, it may also be done as a solution in a solvent. The inert solvent also serves as a diluent gas during reaction since it is fully vaporized along with the solvent. As also noted above, all or a part of the diluent, whether an inert or neutral gas or separately vaporized solvent may be blended with the vaporized piperazine.

In the present process use of some diluent is definitely preferable. The amount of diluent used will vary, not only with the molecular weight of the chosen diluent, but also with a number of other factors. In a complex reaction, such as the present one, in which various side reactions occur, the optimum practice must involve at least some element of compromise. For example, in the present reaction, as the partial pressure of piperazine is increased, the total piperazine throughput for a given apparatus and catalyst mass increases. But, the conversion to and yield of ammonia also increases and the total conversion of piperazine, as well as the conversion to and yield of pyrazine falls off markedly. A good compromise of these factors, therefore, indicates that the partial pressure of pyrazine entering the conversion chamber should be from about 0.1 to 0.3 or 0.4 atmosphere.

From the point of view of commercial practice the life of a catalyst and its susceptibility to reactivation are also important. In carrying out the development work on the catalysts of the present invention it was found that they could be readily reactivated. That is, carbonaceous material deposited during the dehydrogenation process eventually reduces the activity of the catalyst. These tarry materials may be removed by passing air or oxygen-containing gas over the catalyst. This reactivation is followed by reduction where necessary. The temperature during reactivation must be limited so that the exothermic reactivation process does not result in permanent sintering of the surface. It was also found advisable to keep the catalysts in an atmosphere of hydrogen wherever possible from the time it was reactivated to the time it was ready to be used again.

The invention will be more fully described in conjunction with the following example which is intended as illustrative only and not by way of limitation. Unless otherwise noted, all parts are by weight and percentages of conversion and yields are expressed in mol percent.

*Example*

A sample of piperazine was made into a substantially saturated solution at room temperature in thiophene-free benzene. Successive portions of this solution were completely vaporized, preheated to substantially the catalyst temperature and passed over a catalyst comprising about 6% of palladium metal on 6–12 mesh granulated charcoal. The condensable vapors were taken from the reacted material and the pyrazine and unconverted piperazine were separated from the condensate by fractional distillation. Ammonia yields were estimated by bubbling the non-condensable gases through sulfuric acid. Successive runs at temperatures of from about 250-450° C. were made. Yields of 18-25% of pyrazine were obtained in a single pass at from about 350-450° C. with unconverted piperazine recovery of about 50-70%. The active life of the catalyst decreased somewhat as the temperatures went above about 400° C. The products were characterized by extremely low ammonia contents in the reacted vapors.

I claim:

1. The method of producing pyrazine which comprises completely vaporizing piperazine; passing the vaporized material over a palladium dehydrogenation catalyst at dehydrogenation temperatures; condensing the condensable portion of the reacted vapors and isolating the pyrazine content of the condensate.

2. The method of producing pyrazine which comprises completely vaporizing piperazine; passing the vaporized material over a palladium dehydrogenation catalyst at 250-450° C.; condensing the condensable portion of the reacted vapors and isolating the pyrazine content of the condensate.

3. A method according to claim 1 in which the catalytic mass comprises about 2-20% of palladium on a surface-active, non-pyrolytic carrier.

4. A method according to claim 1 in which the catalytic mass comprises about 2-20% of palladium on a charcoal carrier.

5. A method according to claim 1 in which the catalytic mass comprises about 2-20% of palladium on an "activated" alumina carrier.

6. A method according to claim 1 in which the catalytic mass comprises about 2-20% of palladium on a charcoal carrier, the temperature being maintained at 250-350° C.

7. A method according to claim 1 in which the catalytic mass comprises about 2-20% of palladium on an "activated" alumina carrier, the temperature being maintained at 300-450° C.

8. The method of producing pyrazine which comprises forming a mixture of completely vaporized piperazine and an inert diluent in which the partial pressure of piperazine is from about 0.1-0.4 atmosphere; passing the mixture over a palladium dehydrogenation catalyst at dehydrogenation temperatures; condensing the condensable portion of the reacted vapors and isolating the pyrazine content of the condensate.

9. A method according to claim 8 in which the diluent is a completely vaporized fluid selected from the group consisting of water, benzene, quinoline, xylene and toluene.

10. A method according to claim 8 in which the reaction temperature is from about 250-450° C.

11. A method according to claim 8 in which the catalytic mass comprises about 2-20% of palladium on a surface-active, non-pyrolytic carrier.

12. A method according to claim 8 in which the catalytic mass comprises about 2-20% of palladium on a charcoal carrier.

13. A method according to claim 8 in which the catalytic mass comprises about 2-20% of palladium on an "activated" alumina carrier.

14. A method according to claim 8 in which the catalytic mass comprises about 2-20% of palladium on a surface-active, non-pyrolytic carrier, the temperature being maintained at 250-350° C.

15. A method according to claim 8 in which the catalytic mass comprises about 2-20% of palladium on an "activated" alumina carrier, the temperature being maintained at 300-450° C.

JAMES KENNETH DIXON.

REFERENCES CITED

The following references are of record in the file of this patent:

UNITED STATES PATENTS

| Number | Name | Date |
| --- | --- | --- |
| 2,184,235 | Groll | Dec. 19, 1939 |
| 2,272,711 | Hull | Feb. 10, 1942 |

OTHER REFERENCES

Jour. Am. Chem. Soc., vol. 56 (1934), pp. 153-4.